May 28, 1935.    T. E. BROCKSTEDT    2,003,240

METHOD OF AND APPARATUS FOR RADIODYNAMIC STEERING CONTROL

Original Filed Aug. 28, 1930

Theophile E. Brockstedt
INVENTOR

Patented May 28, 1935

2,003,240

UNITED STATES PATENT OFFICE 2,003,240

METHOD OF AND APPARATUS FOR RADIO-DYNAMIC STEERING CONTROL

Theophile E. Brockstedt, San Francisco, Calif., assignor to Washington Institute of Technology, Inc., a corporation of Delaware Application August 28, 1930, Serial No. 478,497
Renewed April 17, 1935

23 Claims. (Cl. 250—2)

This invention relates to a method of directive radio signal transmission and translation, and the automatic control of steering apparatus in accordance with the characteristics of the transmitted signals, and this specification is in part a continuation of an application entitled Radio signal apparatus and method, Serial No. 151,915, filed: Dec. 1, 1926, Patent No. 1,865,826.

An object of the invention is to provide a transmitting apparatus arranged to propagate directively two sustained pulsations of different frequencies to form radio courses at different angular positions around the beacon transmitter.

Another object of the invention is to provide a radio apparatus arranged to receive sustained pulsations of given frequencies to actuate signal devices that will vibrate in resonance with the audio frequencies propagated by the station generating the pulsations.

A further object of the invention is to provide a selective differential relay responsive only to particular frequencies and arranged to be actuated in accordance with the relative intensities of the received signals arranged to actuate the relay.

A further object of the invention is to provide a radio signal translating device including a plurality of resonant elements, each pair of which may be actuated on a different radio frequency carrier wave, and so arranged that any selected pair of resonant elements may be made to respond to the different tone modulations propagated by a given transmitting station to guide a vessel or plane thereby in accordance with a predetermined course indicated by the received signals.

A still further object of the invention is to provide means whereby vessels may be automatically steered and controlled in accordance with the relative intensities of the received signals.

Another object of the invention is to provide means with the translating device to reverse the order of operation of the steering control apparatus to compensate for the ambiguous characteristics of the transmitted signals at different angular positions around the beacon.

Another object of the invention is to provide means with the transmitting apparatus for reversing the sequence of transmission of the differently characterized waves propagated by the directional antennas, to accomplish at the receiving station when desired, a reversal in the order of operation of the automatic steering control apparatus in radiodynamically controlled torpedoes and gyro-controlled aircraft.

A further object of the invention is to describe methods for transmitting, translating, and applying the double modulation radio beacon signals to control the steering of movable bodies.

Other objects of the invention will be made apparent in the course of description.

The double modulation type directive radio beacon as described in the above identified application comprises two directional antennas arranged at an angle to one another and transmitting apparatus well known in the art associated with the same for transmitting over each antenna a different audio frequency modulation to identify the individual signals. The antennas are both designed to radiate carrier waves preferably of the same oscillation frequency, the said waves having propagation characteristics peculiar to directional antennas. Conjoint radiation by the two directional antennas set at an angle to one another results in the fixation of zones of equal signal intensities at definite angular positions around the beacon. These equisignal zones may be employed as definite courses for aircraft and marine vessels to steer upon.

This double modulation type of directive radio beacon was first proposed by this applicant as an aural system of signal propagation in which the two different modulation frequencies, by their distinctive audio pitch, were the sole means of identifying the two transmitted signals. Prior to my conception and invention of the double modulation type of beacon, and the subsequent filing of the above identified application, the crossed-coil directive radio beacon signals were identified by code signals which were produced by interrupting a single modulation frequency common to both antennas. The code signal method of modulating the carrier waves is not suitable for the operation of such visual signal indicators and automatic control apparatus as I have invented. The two systems are distinctly different.

The instant application relates to means for automatic steering of marine vessels and aircraft and also the maneuvering of radio controlled torpedoes and aircraft by a simple manipulation of the transmitting apparatus. The gyro-controlled aircraft makes no automatic allowance for wind drift. My automatic steering apparatus solves the problem of wind drift for gyro-controlled aircraft. In the automatic piloting of marine vessels the present invention will supersede the gyroscopic compass under certain conditions in navigation. In the steering of movable bodies on a horizontal plane there are but two fundamental movements common to them all, namely, a movement of the rudder to the right and a movement of the rudder to the left, and the means of restoring the rudder to its initial position is commonly incorporated in the steering apparatus itself and thus the system of radio control herein described is adapted to control all types of electrically controlled automatic steering apparatus. Provision is also made in this invention to aid the navigator in maintaining a definite course at any angular position around the beacon when automatic steering apparatus is not provided on the vessel.

Fig. 1 in the drawing represents the directive radio beacon transmitting apparatus.

Fig 2a represents a modification of the steering mechanism.

Figure 1:
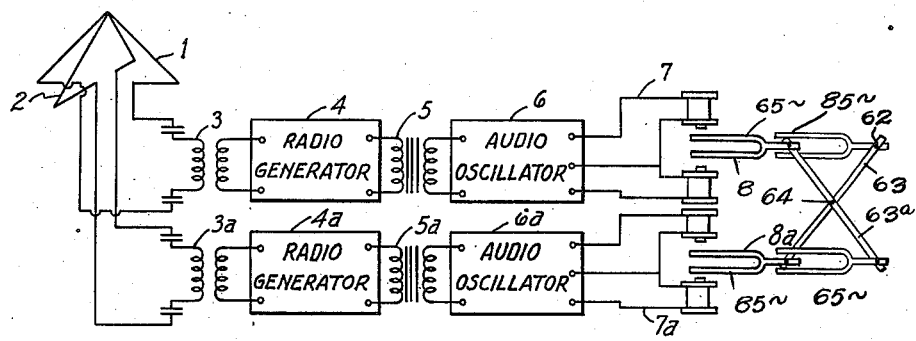

The transmitting antennæ circuits 1 and 2, Fig. 1 are designed to transmit carrier waves preferably of the same oscillation frequency and are connected to their respective wave generators 4 and 4a through transformers 3 and 3a. The carrier waves generated at 4 and 4a are modulated through transformers 5 and 5a by means of audio frequency oscillators 6 and 6a, the frequencies of which are determined and controlled through electromagnetic pick-up circuits 7 and 7a by means of frequency standards 8 and 8a which in this diagrammatic arrangement take the form of tuning forks. The forks 8 and 8a have been given a definite frequency of 65 and 85 cycles respectively for purposes of explanation of the operating characteristics of the system. The tuning forks 8 and 8a, or any other frequency standards that may be employed in their stead, have periods corresponding to the different periods of vibration of the differential relay reeds 19 and 20, Figs. 2 and 3.

Figure 2:
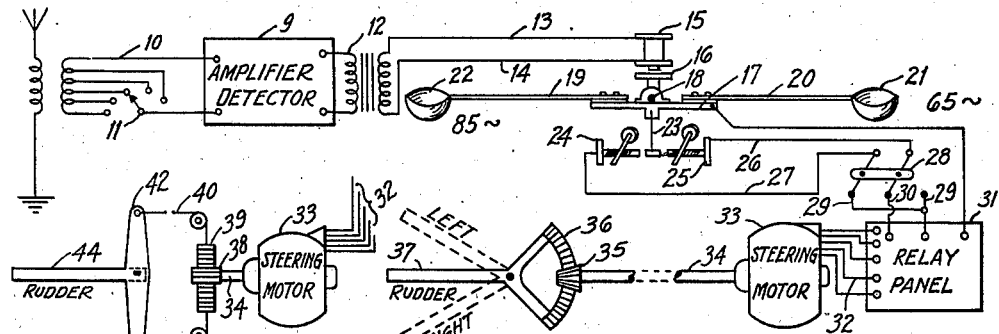
Fig. 2 is a diagrammatic representation of the radio receiving apparatus and a tuned reed differential relay translating device arranged to control the steering mechanism of marine vessels and aircraft.

A conventional type of receiving device is shown at 9, Fig. 2, which has a tunable circuit 10 provided with means at 11 arranged to allow rapid and positive selection of desired carrier frequencies from various beacon transmitters. The modulations of the carrier waves are detected by the receiver 9 and the audio frequency output thereof is passed through transformer 12 connected by wires 13 and 14 to the electromechanical translating device comprising an electro-magnetic unit 15 arranged to actuate the armature 16 which carries a supporting member 17 pivotally connected to the armature at 18 which is the axis of rotation of the supporting member 17, which supports a pair of reeds 19 and 20 each of which has an unbalanced air vane 21 and 22 fastened to its free end. The member 17 will be provided with the usual retractile spring employed with such apparatus to keep the movable member 17 in a neutral position when not actuated by the vibratile elements 19 and 20. The fixed ends of the reeds 19 and 20 are fastened to the supporting member 17 which also carries a spring contact maker 23 which is arranged to make contact with either contact 24 or 25 depending upon which one of the reeds 19 or 20 is vibrating with the greater amplitude at a given time. When the reeds are vibrating with equal amplitude the aerodynamic forces developed by the unbalanced air vanes 21 and 22 are equal and opposite and the contact maker 23 maintains a neutral position between the contacts 24 and 25. If, however, the right hand reed 20 increases its amplitude in response to increased strength of the 65 cycle signal, and the vibratory amplitude of reed 19 is correspondingly decreased, due to the relative intensities of the received signals, the air vane 21 will produce an unbalanced turning moment on the supporting member 17 which in rotating on its axis of rotation 18, will move the contact maker 23 against the contact 24, thus closing circuit 27. This unbalanced turning moment of the air vane 21 results from the fact that its concave side beats against greater air resistance than does the convex side of the vane and thus the air vane 21 developes a turning moment in the direction of least air resistance which in this case is downward relative to the drawing. If the operating conditions are reversed, the air vane 22 will move the contact maker 23 against the contact 25, thus closing circuit 26. From the example cited it will be clear that the differential action of this relay or translating device will follow the relative increases or decreases of signal intensities prevailing when a vessel so equipped moves to one side or another of a designated equisignal zone or radio course.

When the entire system is in operation, the reeds 19 and 20 vibrate in resonance with their respective tuning forks 8 and 8a in the transmitting apparatus Fig. 1, the respective vibratory amplitudes of the reeds being governed by the radiation characteristics of the two transmitting antennas 1 and 2. The adjustable contacts 24 and 25 which allow courses to be set at different angular positions around the beacon are connected through circuit wires 26 and 27 to a relay reversing switch 28 which may be connected to the terminals 29 and 30, or in the reverse order, 30 and 29 from the relay panel 31. This relay reversing switch 28 provides for a reversal of the order of operation between the contacts 24 and 25 and the primary steering mechanism actuating relays on the panel 31. This reversal of the operating conditions of the translating device shown from 19 to 25 is necessary, due to the reversed condition of the relative positions of the maximum signal zones at certain angular positions around the beacon and for the further reason that the relative positions of the maximum signal zones, with respect to the heading of the vessel, are found reversed when a course toward the beacon is reversed to a course away from the beacon. Connected to the relay panel 31 by wires 32 is a diagrammatic representation of a well known type of automatic steering mechanism comprising a motor 33 controlled through the relay panel 31 and which drives a shaft 34 having a beveled gear 35 at its end which engages with the gear teeth on the quadrant 36 associated with the rudder 37 for moving the same to the right or left and then restoring the same to its initial position shown, in accordance with the operating characteristics of the restoring relays on the panel 31. The relay panel system 31 is common to most types of electrically controlled automatic steering apparatus and is old in the art, but the relay reversing switch in this combination for reversing the order of operation in this system is a part of my invention. At 44, Fig. 2a, is shown the rudder of an air-craft arranged for operation with the system of radio control and in which the motor 33 connected by wires 32 to the relay panel 31 is arranged to operate and again restore the rudder 44 to its initial position through the shaft 34, pinion 38, rack 39, rudder cables 40 and 41, and rudder horns 42 and 43 which turn the rudder 44 to the right or left and restore the same to its initial position in accordance with the operation of the circuit completing contacts 24 and 25.

Figure 3:
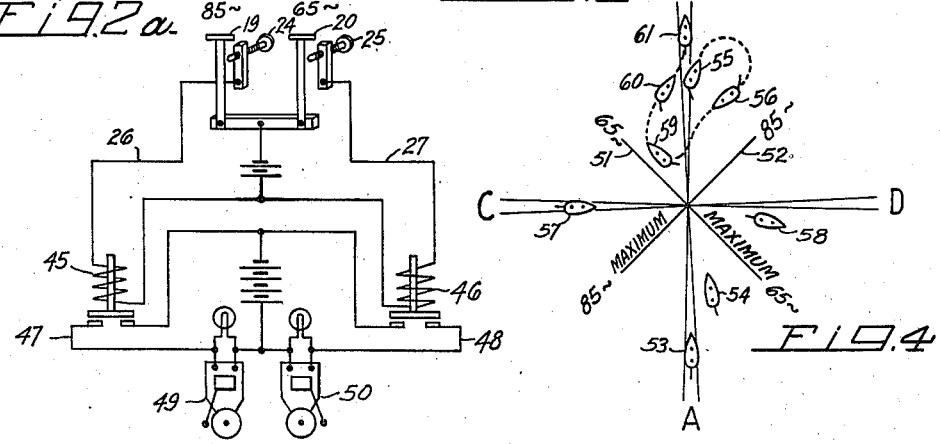
Fig. 3 is a diagrammatic representation of a differential relay with associated relay circuits.

Fig. 3 is a representation of the vibrating reed relay associated with a pair of signal lamps and bell alarms 49 and 50 or other mechanism to be controlled thereby and comprising in this arrangement a pair of reeds 19 and 20 which are responsive to two actuating pulsations of different frequencies applied to said reeds. Adjustable contacts 24 and 25 are arranged adjacent the reeds 19 and 20 to complete relay circuits 26 and 27 to operate secondary relays 45 and 46 which in turn close circuits 47 and 48 at predetermined vibratory amplitudes of reeds 19 and 20. The mechanism 49 and 50 is operated and controlled by relay circuits 26 and 27 in accordance with the relative intensities of the two signals received at 9, Fig. 2, and arranged to actuate the reeds 19 and 20, the relative amplitudes of said reeds being governed by the relative intensities of the two signals received. The selective differential relay shown in Fig. 3, is not limited to the operation of such devices as shown at 49 and 50, but is well adapted to control such automatic steering mechanism as is described by O. E. Winter in United States Patent No. 1,589,673 for a Regulating compass. The relays 45 and 46 shown in my control device will function in place of the regulating compass selenium cell relays 8 and 9 which energize the circuits controlling the switch relay electro-magnets 19 and 20, Fig. 1 in Winter's drawing. By connecting the switch relay electro-magnets 19 and 20 shown in Winter's drawing in place of the apparatus shown at 49 and 50, Fig. 3 in my drawing, a vessel so equipped can be made to steer itself automatically on definite courses by means of directive radio beacon signals. The same principle applies to aircraft and other devices capable of being steered on definite courses.

Figure 4:
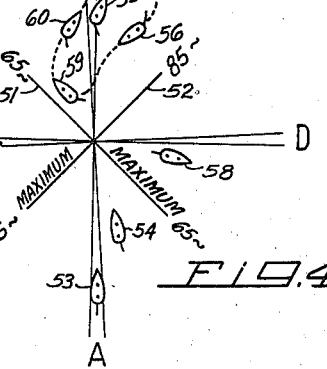
Fig. 4 is an illustration of the signal characteristics of the double modulation directive radio beacon and also showing vessels in relative positions with respect to the various courses established by the directively transmitted signals.

Fig. 4 illustrates the relative positions of the definitely fixed and characteristically distinctive signal zones as they range at different angular positions around the double modulation type directive radio beacon. The lines 51 and 52 represent the directional antennas of the beacon arranged at an angle to one another. They represent the lines along which the maximum directive effect is encountered for the control of such steering mechanism as herein described. The double lines A, B, C, and D represent zones of equal signal intensity and are the four courses commonly available as aids to navigation but will, in this explanation of the system, be considered as of secondary importance since the present invention contemplates an unlimited number of courses in any direction to or from the beacon. That my elucidation of the complex functioning of the apparatus in this system may be easier to follow, it is suggested that the vessels shown from 53 to 61 be considered more particularly as to their relative positions or proximity to one or the other of the maximum signal zones which are designated by the characters 85 cycles and 65 cycles respectively, and attention is not therefore directed to the particular course on which a vessel may be heading at a given time. Designations of the relative directions, right and left, assume the observer to be facing the bow of the vessel.

The vessel 53 is proceeding toward the beacon on course A which is equi-distant from the two maximum signal zones 51 and 52. The maximum signal of 65 cycles lays on the right hand side and the maximum 85 cycle signal lays on the left hand side of the vessel. Assuming that the vessel 53 is holding a perfectly steady course, the automatic steering apparatus on the vessel remains inactive due to the fact that signals of equal intensity are received and the reeds 19 and 20 are vibrating with equal amplitude, thus holding the contact maker 23 in the neutral position shown between the contacts 24 and 25, Fig. 2. The relay reversing switch is in the proper position for maintaining the vessel on this course, or if more specifically stated, the reversing switch 28 is in the proper position, as shown in the drawing, at all times when the maximum 65 cycle signal lays on the right hand side of the vessel whether proceeding toward or away from the beacon. If the maximum 65 cycle signal lay on the left hand side of the vessel as is the case with the vessel at 57 which is proceeding toward the beacon on course C, the beacon signals would be received in a reversed manner and the reversing switch 28 must now be changed over to its second position to reverse the order of actuation of the primary relays on the panel 31. Considering again the vessel 53, if this vessel begins to turn or drift to the right of course A as shown at 54 it will have moved toward the maximum 65 cycle signal zone and will receive signals of increased strength at 65 cycles and proportionately decreased strength at 85 cycles. The reeds 19 and 20 will respond to the changed signal intensities and the reed 20 tuned to 65 cycles will increase its vibratory amplitude and incidentally will increase the unbalanced turning moment produced by the air vane 21 with the result that the movable supporting member 17 will turn on its axis of rotation 18 causing the contact maker 23 to move against contact 24, thus closing circuit 27 which actuates the proper relay on the relay panel 31 for turning the rudder 37 to the left by means of motor 33 and associated driving mechanism 34, 35, and 36. The rudder in a position to the left of its initial position will cause the vessel to turn back to its proper course on A. When the vessel is again in a position where it receives signals of equal intensity the reeds will again vibrate with equal amplitude and the contact maker 23 will again be restored to its neutral position. If it is desired to maintain a course at a distance to the right of the course A the vessel will be brought on to the course desired and the contacts 24 and 25 adjusted until they just fail to make contact with contact maker 23. The reeds will now acuate the steering mechanism in the same manner as above described and maintain the vessel on a fixed course. The same action holds good in the case of aircraft rudder 44. If the vessel 53 were headed in the opposite direction or away from the beacon the relative positions of the maximum signal zones with respect to the heading of the vessel would be found reversed and would require operation of the reversing switch 28. If the reversing switch is not changed over to its second position when the maximum 85 cycle signal lies on the right hand side of the vessel, the automatic steering apparatus will cause the vessel to execute the maneuver shown at 55 and 56 on course B. As a further example of the manner in which the reversing switch takes care of the ambiguous relation of the transmitted signals, reference is made to vessels 54 and 58. Vessel 54 is moving toward the beacon and vessel 58 is moving away from the beacon and both vessels on different equisignal zones, A and D, yet the operating condition of the steering apparatus on both vessels is the same since the maximum 65 cycle signal is on the right hand side of both vessels. If the relay reversing switches 28 on both vessels 54 and 58 were changed over to their second positions, both vessels would execute a 180 degree reversal in their courses as indicated at 55 and 56 and then continue on their reversed courses at the same angularly displaced positions on the same sides of the equisignal zones A and D as they previously occupied. The vessel 55 is executing a 180 degree maneuver resulting from the fact that the reversing switch 28 is in the wrong position at a time when the maximum 85 cycle signal is on the right hand side of the vessel. When the vessel veered a little to the right of its course on B, the 85 cycle reed increased its amplitude and closed the circuit 26 which caused the rudder 37 to be turned to the right, thus causing the vessel to make a 180 degree maneuver, unable of itself to come out of the maneuver until it returns again, as at 56, to its initial position on course B but proceeding in the opposite direction toward the beacon and under which conditions the steering apparatus can function normally. For a clear understanding of the operation of the steering mechanism with respect to the beacon signals which govern the action of the steering apparatus, two rules should be carried clearly in mind. The first rule is that when the relay reversing switch 28 is in its first position, as shown in the drawing, the 65 cycle signal always turns the rudder to the left and incidentally steers the vessel to the left, and the 85 cycle signal always steers the vessel to the right when it is the predominant controlling factor. The second rule is: that when the relay reversing switch 28 is in its second position, as suggested by the terminals 30—29 on panel 31, the 65 cycle signal always steers the vessel to the right when it is the predominant controlling factor, while the 85 cycle signal always steers the vessel to the left when it is the controlling factor. These rules hold good regardless of the direction of the course or the heading of the vessel to or from the beacon. Referring to the vessels on course B, Fig. 4, the maneuver shown at 55 and 56 is in accordance with rule one. The maneuver shown at 59, 60, and 61 is in accordance with rule two. This method of maneuvering vessels can be made useful for military purposes through another feature of this invention based on the following principle. The operation of the relay reversing switch on the vessel produces an effect equivalent to that produced by reversing the sequence of transmisison of the modulation frequencies at the beacon, and therefore, exchanging the modulation frequencies from one antenna to the other at the beacon produces an effect equivalent to the effect produced by reversing the order of response of the automatic steering apparatus on the vessel.

Mechanical means for carrying out the exchange of modulation frequencies from one antenna to the other at the beacon is shown at 64, Fig. 1. The electrical equivalent of the mechanical means shown is a triple pole double throw switch for each of the electromagnetic pick-up circuits 7 and 7a, operatively connected for simultaneous operation. The function of this switching arrangement, when operated, is to exchange the connections normally existing between the electromagnetic pick-up circuits 7 and 7a and the audio oscillators 6 and 6a as shown in the drawing, Fig. 1. Either method of accomplishing this result, whether mechanical or electrical, is within the scope of this invention, though only the mechanical method has been shown for simplicity of illustration. The pick-up circuits 7 and 7a with their respective tuning forks 8 and 8a represent the primary arrangement of the apparatus. To this arrangement has been added an extra pair of tuning forks of corresponding frequencies but positioned in reverse order relative to the pick-up magnet circuits 7 and 7a. The additional forks are pivotally connected as at 62 to a pair of levers 63 and 63a which are pivotally fulcrumed at 64 on a fixed support not shown. The forks shown arranged in pairs are designed to operate in side by side relation under the pick-up magnets in circuits 7 and 7a. When transposition of the modulation frequencies from one antenna to the other is desired, the levers 63 and 63a fulcrumed at 64 are operated to withdraw the forks 8 and 8a from under the pick-up magnet poles and simultaneously insert thereunder the additional set of forks, the respective vibratory periods of which are in the reverse order relative to the periods of the forks 8 and 8a which are withdrawn. It is thus seen that each time the levers 63 and 63a are operated the modulation frequencies, 65 and 85 cycles, induced in the electric pick-up circuits 7 and 7a are transposed. This transposition of the relative positions of the maximum signals of different frequencies transmitted by the beacon, as illustrated in Fig. 4, may also be accomplished by rotating the goniometer, if there is one available, through an angular distance of 90 degrees.

By manipulation of the means described for transposing the modulation frequencies, or by rotation of the goniometer, if available, through 90 degrees for reversing the order of operation of the steering apparatus on the radio controlled vessel, together with a direction finder for locating the target, torpedoes and aircraft equipped with the apparatus herein described can be made to execute the following maneuvers. The torpedo or aircraft will automatically follow the equisignal zone. The goniometer, if available, will rotate the equisignal zone in any direction in which it is desired that the craft should be steered. If the controlled craft has missed its mark and is located at 55 on course B in the drawing, the controlled craft may be returned for another attempt by transposing the modulation frequencies on the beacon antennas and at the same time moving the equisignal zone to one side momentarily to set the steering mechanism in operation. The vessel will now execute a 180 degree turn as shown at 56 and return toward the beacon. After having returned a sufficient distance the modulation frequencies may again be transposed and the craft will execute another 180 degree turn as shown at 59 and 60. At 61 the craft is again in alignment with the equisignal zone and the target.

The relay system shown in Fig. 3 is to be employed as a visual and audible aid to navigation on vessels not equipped with the automatic steering apparatus, and for other purposes.

It is to be understood that the invention is not limited to any specific construction but might be embodied in various forms without departing from the spirit of the invention or the scope of the appended claims.

Having described my invention what I now claim is:

1. In radio signal apparatus, the combination of a plurality of directional antennas arranged at an angle to one another, means associated with the same for transmitting a different audio frequency tone modulation over each of said antennas, and means for transposing said different tone modulations from one antenna to the other under particular operating conditions of the radio apparatus.

2. The method of remote control of distant apparatus which includes the steps of simultaneously transmitting two distinctive and sustained directional control signals from a given point, utilizing said signals to establish two opposing control forces whose relative intensity is dependent upon the relative intensity of the respective signals, effecting the desired control by the differential force resultant from said control forces, and altering the characteristics of the transmitted signals to unbalance said control forces when desired and thereby effect the remote control of said distant apparatus.

3. The method of remote control which includes the steps of simultaneously transmitting two differently characterized directional control signals ranging at an angle to one another in their spatial distribution from a single control station, receiving said signals at a distant point, utilizing said signals simultaneously to establish two opposing control forces whose magnitudes are proportional to the amplitudes of the received signals, and utilizing the resultant differential control force to effect a movement in space dependent on the arbitrary relative distribution of the control signals, from said control station.

4. The method of remote control which includes the steps of transmitting a pair of control signals of substantially equal total energy and different spatial distribution to produce a zone of equal signal amplitude and other zones, wherein the one or the other of said signals respectively is of greater intensity than in said equal intensity zone, receiving said signals at a point within one of said zones, utilizing said signals to establish a pair of opposing control forces whose intensity is dependent upon the intensity of the received signals, utilizing the resultant differential force to control a movement toward the equal signal zone, and altering the effective control by shifting the position of the equisignal zone.

5. The method of remote control of distant mechanisms which comprises the steps of simultaneously transmitting two sustained directional signals having different tone frequency characteristics, receiving said signals, inducing resonant vibrations with each of said signals, and effecting the desired control by means of the difference in amplitude of said vibrations arising through difference in amplitude of the received signals.

6. The method of remote control of distant apparatus which comprises the steps of transmitting two directional control signals from a given point each characterized by a distinctive tone frequency, receiving said signals, generating a pair of opposing mechanical forces proportional to the amplitude of the tone frequency characteristics of the received signals, and effecting the desired control by means of the resultant differential force.

7. In a system of radio control, the combination with a dirigible, directive radio transmitting apparatus of the class disclosed remote from said dirigible for propagating signals, a signal receiving device on said dirigible, a selective differential control device in the output circuit of said receiving device, automatic steering apparatus operatively connected with said control device for operation thereby, and means associated with said transmitting apparatus for reversing the sequence of transmission of said signals to cause said dirigible to change its direction of movement at a given time, when desired.

8. In navigational apparatus, comprising a directive radio beacon for transmitting waves modulated with different tone frequencies in different directions of maximum transmission, a radio receiving device on a craft, resonance relay control apparatus arranged in the output circuit of said receiving device, and signal apparatus connected to said control apparatus to afford an alarm or convey information useful to pilots.

9. In combination, a plurality of angularly arranged directional antennas, means for radiating waves modulated with different audio frequencies from each of said antennas, a receiving device, a plurality of electro-mechanical resonance relays operatively connected with said receiving device for actuation thereby, and apparatus operatively connected to said relays to be controlled thereby.

10. In combination, a plurality of directional antennas arranged at an angle to one another, means associated with said antennas to transmit tone modulations of differet frequencies over each of said antennas, a receiving device, a plurality of differently tuned vibratile elements associated with means for driving the same and operatively arranged for resonant actuation by the current impulses of corresponding frequencies in the output circuit of said receiving device, a plurality of control circuits arranged for actuation by said elements respectively, and desired apparatus connected to said control circuits.

11. In combination, a plurality of directional antennæ arranged at an angle to one another, means associated with said antennæ for transmitting thereover waves modulated respectively with different audio frequencies, a receiving device, a mechanically selective differential control device including actuating means adapted to convert electrical pulsations into mechanical vibrations and connected in the output circuit of said receiving device, and desired apparatus connected with said control device for actuation thereby.

12. The combination comprising means for transmitting distinctive directional waves ranging in different directions from a given point, a receiving device, a mechanical resonance differential relay having actuating and coupling means adapted to convert electrical into mechanical energy and operatively connected with said receiving device for operation thereby, and steering apparatus operatively connected to said differential relay.

13. The method of transmitting and translating directive radio signals, which includes the steps of generating a plurality of differently characterized waves having zones of maxium amplitude of transmission in definite directions, giving said waves a certain order of transmission with respect to the relative spatial arrangement of their respective zones of maximum amplitude of transmission, receiving said waves at an arbitrary position in space, translating said waves into a plurality of distinctive actuating forces, applying said forces to control the actuation of apparatus, and when desired, changing the order of transmission of said waves to effect a reversal in the order of actuation of said apparatus.

14. In a system of navigation the method of guiding a craft automatically on definite radio courses, which includes the steps of generating radio frequency oscillations at a position remote from said craft, modulating said oscillations with a plurality of frequencies, directionally transmitting said oscillations to produce maximum transmission of waves modulated with the different frequencies in different directions, receiving and detecting said waves, causing said waves to establish vibrations mechanically resonant to the modulating frequencies, and causing said vibrations to control the actuation of suitable apparatus on said craft to produce the desired result.

15. The method of transmitting and translating directive signals, which includes the steps of generating radio frequency oscillations, modulating said oscillations with a plurality of frequencies, directionally transmitting said oscillations to produce maximum transmission of waves modulated with the differerent frequencies in different directions, receiving and detecting said waves, causing said waves to establish vibrations mechanically resonant to the modulating frequencies, and utilizing the dynamic forces developed by said vibrations to control the actuation of apparatus in accordance with the relative magnitudes of said dynamic forces.

16. The method of remote control of movable bodies, which includes the steps of simultaneously transmitting a plurality of differently characterized control signals having different spatial distributions, receiving said signals at a given point, utilizing said received signals simultaneously to establish opposing control forces whose magnitudes are proportional to the amplitudes of the received signals, utilizing the resultant differential force to control the steering of a movable body in space, and causing said body to execute a reversal in direction of its movement when desired by reversing the sequence of transmission of said characterized control signals.

17. The method of remote control which comprises the steps of transmitting a plurality of directional control signals each characterized by a distinctive tone frequency, receiving said signals, generating a pair of opposing forces whose magnitudes are proportional to the amplitudes of the tone frequency characteristics of the received signals, effecting the desired control by means of the resultant differential force, and reversing the order of said control when desired by reversing the order of transmission of said control signals.

18. The method of remote control which comprises the steps of transmitting two control signals having distinctive characteristics and different amplitudes in their spatial distributions from a single control station, receiving said signals at a given point, generating opposing control forces with each of said signals, effecting the desired control by means of the differential resultant force arising through difference in amplitude of the received signals, and altering the desired control when necessary through alteration of the relative amplitudes of said received signals by changing the spatial distributions of said transmitted control signals.

19. The method of transmitting directional signals, which comprises transmitting directively a plurality of differently characterized waves to produce zones of maximum signal intensity ranging in different relative directions, and reversing the sequence of transmission of said waves to reverse the effect of said waves at a receiving station, when desired.

20. The method of transmitting and translating directional signals, which includes the steps of producing and transmitting directively a plurality of waves of radiant energy to produce zones of maximum signal intensity by each of said waves and also zones of equal signal intensities by said waves conjointly, modulating each of said waves with a different audio frequency pulsation, translating the plurality of pulsations of received energy into a plurality of distinctive actuating forces, applying said forces to control the actuation of apparatus in accordance with the relative intensity of the received signals, and when desired, transposing the modulating pulsations of different frequencies from one to the other of said waves to effect a transposition of the distinguishing characteristics of said zones of maximum signal intensity.

21. The method of transmitting and translating directional signals, which consists in transmitting directively a plurality of tone modulations to produce zones of maximum signal intensity, giving each of said tone modulations a different audio frequency, receiving and translating said tone modulations into a plurality of distinctive mechanical actuating forces, applying said forces to control mechanisms in accordance with the relative intensity of the received signals, and reversing the order of transmission of said tone modulations when desired to effect a transposition of the differently characterized zones of maximum signal intensity with respect to their spatial distribution and thereby alter the effective control of said mechanism.

22. In a system of automatic navigation, the method of controlling the movement of a craft automatically on predetermined courses, which includes the steps of propagating directionally transmitted waves modulated with different frequencies and having different directions of maximum transmission from a given point, receiving and causing said waves to induce resonant mechanical vibrations on the craft, generating opposing control forces with each of said vibrations, effecting the desired control by means of the differential resultant force arising through difference in amplitude of said vibrations, and causing the maintenance of a desired course relative to the spatial distribution of said waves by regulating the relative difference in amplitude of said vibrations at which the differential resultant force effects the steering of the craft.

23. In a system of navigation the method of automatic steering control which consists in transmitting directively two sustained tone modulations of different frequencies to produce zones of equal signal intensity and other zones, receiving and causing said tone modulations to induce resonant mechanical vibrations having relative amplitudes dependent upon the relative intensities of the received signals, causing said vibrations to produce dynamic forces acting in opposition with magnitudes dependent upon the relative amplitudes of said vibrations, and effecting the desired control by means of the differential resultant force arising through the difference in amplitude of the induced vibrations.

THEOPHILE E. BROCKSTEDT.